(12) United States Patent
Kidder (10) Patent No.: US 6,363,413 B2
(45) Date of Patent: *Mar. 26, 2002

(54) METHOD AND APPARATUS FOR INCREASING THE EFFECTIVE BANDWIDTH OF VIDEO SEQUENCES TRANSMITTED OVER A NETWORK BY USING CACHED DATA

(75) Inventor: Jeff Kidder, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/227,724

(22) Filed: Jan. 8, 1999

Related U.S. Application Data (63) Continuation of application No. 08/775,407, filed on Dec. 31, 1996, now Pat. No. 5,898,833.

(51) Int. Cl.$^7$ .............................................. G06F 15/16
(52) U.S. Cl. ...................................... 709/203; 709/219
(58) Field of Search ............................... 709/201–203, 709/217–219, 230–232, 234, 246; 345/744; 725/87–89, 100, 101, 131, 140, 142, 151

(56) References Cited

U.S. PATENT DOCUMENTS

| | | | |
|---|---|---|---|
| 5,727,159 A | | 3/1998 | Kikinis .................... 395/200.76 |
| 5,737,495 A | | 4/1998 | Adams et al. ............... 395/615 |
| 5,737,536 A | | 4/1998 | Herrmann et al. ...... 395/200.59 |
| 5,742,892 A | * | 4/1998 | Chaddha ...................... 725/146 |
| 5,745,642 A | | 4/1998 | Ahn ............................... 386/95 |
| 5,754,774 A | | 5/1998 | Bittinger et al. ......... 395/200.33 |
| 5,768,511 A | | 6/1998 | Galvin et al. ............ 395/200.33 |
| 5,768,527 A | | 6/1998 | Zhu et al. ................. 395/200.61 |
| 5,886,733 A | * | 3/1999 | Zdepski et al. ................ 725/64 |
| 5,898,833 A | * | 4/1999 | Kidder ......................... 709/234 |
| 5,930,526 A | * | 7/1999 | Iverson ......................... 710/33 |
| 5,933,835 A | * | 8/1999 | Adams et al. ................ 707/104 |
| 5,996,022 A | * | 11/1999 | Krueger et al. .............. 709/247 |
| 6,025,877 A | * | 2/2000 | Chang et al. ................ 348/395 |
| 6,154,771 A | * | 11/2000 | Rangan et al. ............... 709/217 |
| 6,167,442 A | * | 12/2000 | Sutherland et al. .......... 709/217 |
| 6,182,031 B1 | * | 1/2001 | Kidder et al. ................ 704/205 |
| 6,185,625 B1 | * | 2/2001 | Tso et al. ..................... 709/247 |
| 6,247,050 B1 | * | 2/2001 | Tso et al. ..................... 709/224 |
| 6,230,162 B1 | * | 5/2001 | Kumar et al. ............. 707/104.1 |
| 6,237,031 B1 | * | 5/2001 | Knauerhase et al. ......... 709/221 |
| 2001/0002900 A1 | * | 6/2001 | Romrell ....................... 370/216 |
| 2001/0013123 A1 | * | 8/2001 | Freeman et al. ............... 725/34 |

FOREIGN PATENT DOCUMENTS

EP 0 811 939 A2 * 10/1997

OTHER PUBLICATIONS

Shacham, N., Preemption–Based Admission Control in Multimedia Multiparty Communications, Proc. of INFOCOM '95, vol. 2, pp. 827–834, Apr. 1995.*

Shacham, N., Preemption–Based Admission Control in Multimedia Multiparty Communications, IEEE 1995, pp. 827–834.

* cited by examiner

Primary Examiner—Zarni Maung
Assistant Examiner—Andrew T Caldwell
(74) Attorney, Agent, or Firm—Blakely, Sokoloff, Taylor & Zafman LLP (57) ABSTRACT

A method and apparatus of improving the quality of graphic and/or audio information, such as a video clip, transmitted over a network is provided. In one particular embodiment, a network client requests multiple downloads of a video clip stored on the network server. In response to each request, the network server compresses the video clip and transmits the compressed data in a scalable bitstream. The video clip includes an audio channel which occupies a first portion of the available bandwidth, and a video channel which occupies a second portion of the available bandwidth. Upon receipt of each download, the network client stores the audio and video data in cache. The network client combines the data from each download in the cache prior to displaying the video clip in a web browser program. In each iteration of the download and caching process, the information for the audio and video channels increases, thus improving the resolution of the downloaded image and sound data, and thereby increasing the effective bandwidth of the network over which the video clip was transmitted.

22 Claims, 6 Drawing Sheets

| VIDEO BANDWIDTH |
| --- |
| 16 kb / second 401 |
| AUDIO BANDWIDTH |
| 6 kb / second 402 |

| VIDEO BANDWIDTH |
| --- |
| 6 kb / second 411 |
| AUDIO BANDWIDTH |
| 16 kb / second 412 |

| VIDEO BANDWIDTH |
| --- |
| 11 kb / second 421 |
| AUDIO BANDWIDTH |
| 11 kb / second 422 |

METHOD AND APPARATUS FOR INCREASING THE EFFECTIVE BANDWIDTH OF VIDEO SEQUENCES TRANSMITTED OVER A NETWORK BY USING CACHED DATA

This application is a continuation of a application Ser. No. 08/775,407 entitled "Utilizing Cached Information to Increase Effective Bandwidth", filed on Dec. 31, 1996, now U.S. Pat. No. 5,898,833.

FIELD OF THE INVENTION

The present invention relates generally to the field of multimedia computer applications, and more particularly to improving the display quality of embedded video clips.

BACKGROUND OF THE INVENTION

Computer networks, such as the Internet, are increasingly being used to transmit audio-visual data. One common example is the incorporation of a music video in a World-Wide Web page as a "video clip". A video clip is a sequence of images intended to be displayed in rapid succession to show an animation or "movie", and may incorporate an audio channel for the integration both graphic and audio information to be played by a web browser which is enabled to access such a data. Video clips typically require an enormous number of bits to effectively code the information contained therein. The amount of data in a single digital image can be extremely large, even on the order of millions of bytes. For example, a 640×480 pixel image occupies 307,200 bytes of storage if one byte per pixel is used. A video clip which contains a series of digital images to form a motion sequence along with a channel for digitized audio data is still more demanding. To transmit a video clip containing audio and video data over a network, server and client computers on the network stream the data serially from the server to the client. Because the amount of data required to represent a typical video clip is so large, image compression techniques are utilized to reduce the amount of data transmitted. Image compression requires an encoder to compress the source data and a decoder to decompress the compressed data.

The quality of a video clip transmitted between a server and client computer over a network depends largely on the bandwidth of the network. Bandwidth refers to the maximum number of transactions per second and the number of bits per transaction that a network can transmit from one node coupled to the network to another node coupled to the network. A complex video clip requires a high bandwidth network to accommodate the transmission and decoding of all of the bits which represent the graphic and audio components of the clip. If insufficient bandwidth is available, the number of bits transmitted is reduced, and consequently the image or sound is distorted or not fully represented.

Network bandwidth is a factor of each of the elements in the data path between the nodes, such as computers, which transmit and receive the data. In many computer network environments, the primary element which limits the bandwidth is the network interface device which interface the server and client computers to the networks. For the popular Internet network, such interface devices include modems and ethernet controllers. Present network interface devices for general purpose networking use, such as modems, typically provide data bandwidth that supports a streaming bit-rate of between 19 Kbits/second to 28 Kbits/second. A low average bit rate for these devices would thus be around 22 Kbits/second. For a video clip which contains both graphic and audio data, this bandwidth must be apportioned between the two types of data. One example of such an apportionment for a 22 Kbit/second bandwidth channel would be to allocate a 16 Kbit/second channel for the graphic data and 6 Kbits/second for the audio data. For a video containing a sequence of digital images, a bit rate of 16 Kbits/second is generally considered to be the minimum acceptable rate. At a rate below 16 Kbits/second the quality of the video is generally unacceptable because either the resolution of the images is too low, or the frame rate is so slow that individual frame sequencing is readily apparent (that is, the movement of objects in a video appears to stutter). Unfortunately, providing at least 16 Kbits/second of bandwidth for the video at 22 Kbits/second leaves only 6 Kbits/second for the audio channel. For most audio applications involving music, a bit rate of 6 Kbits/second may be enough only to provide the basic melody with substantial artifacts and without any of the depth or higher order musical information that might be available in the original signal. Thus, present data streaming techniques for the transmission of video clips over the Internet fail to provide a satisfying experience because of the limited bandwidth available to the audio and video channels.

Present application programs which display audio/visual sequences, such as web browsers, utilize techniques which facilitate the re-display of downloaded images, however they do not provide mechanisms which improve the quality of the images. Typical web browsers utilize cache memory to temporarily store the streamed video data which has been decompressed. Cache memory is used to store a digitized image so that the image is available for subsequent access without requiring that the data be re-transmitted from the server to the client. Thus, a second access to a web page image or a video clip accesses data from the cache rather than over the network, to the extent that the data is available in the cache. Present web browsers, however, store only the originally transmitted data in the cache. Thus a user repeatedly accessing a particular video clip views the same clip with the same quality experience each time.

It is thus desirable to provide a method of improving the quality of a transmitted video clip by increasing the effective bandwidth available for the transmission and playback of the video clip. It is further desirable to provide a method of displaying video clips which utilize the cached data to improve the quality of subsequent viewing instances.

SUMMARY OF THE INVENTION

The present invention discloses a method and apparatus for receiving data from a network. In a method of the invention, a node coupled to the network receives and stores a first set of data which represents a data object and receives a second set of data which represents the data object. The first and second sets of data are different and are integrated to provide a third set of data which represents the object.

In one particular embodiment of the invention, the data cache mechanisms of web browsers are utilized to improve the quality of an audio/visual sequence displayed on the web browser. The first access to an audio/visual sequence from a web browser causes the transmission from a server of a sequence in which audio and video channels are apportioned within the available transmission bandwidth. The web browser stores all or a portion of this data within cache memory. A second access to the audio/visual sequence results in a re-transmission of the audio/visual sequence from the server. This second transmission is stored within the cache memory and is combined with the cached data to provide twice the apparent bandwidth to the user. Subsequent accesses of the audio/visual sequence results in subsequent transmissions of the audio/visual sequence. These transmissions are combined with the cached data consisting of the product of data from earlier transmissions, thus effectively multiplying the apparent network bandwidth available to the user. The apparent quality of the playback of the video clip is increased when the web browser uses the resulting cached data, rather than using only data received over the Internet.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for improving the quality of an audio/visual sequence transmitted over a network and accessed through a web browser is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form to facilitate explanation.

Hardware Overview

According to the present invention, host computer systems and routers in a network request and transmit video clips consisting of audio/visual data. According to one embodiment, the steps of accessing, compressing, and transmitting the video data, as well as other aspects of the present invention are implemented by a central processing unit (CPU) in a host computer or a network router executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to the present invention.

The instructions may be loaded into the memory of the computer or router from a storage device and/or from one or more other computer systems over a network connection. For example, a server computer may transmit a sequence of instructions to a client computer in response to a message transmitted to the server over a network by the client. As the client receives the instructions over the network connection, the client stores the instructions in memory. The client may store the instructions for later execution or execute the instructions as they arrive over the network connection. In some cases, the downloaded instructions may be directly supported by the CPU. Consequently, execution of the instructions may be performed directly by the CPU. In other cases, the instructions may not be directly executable by the CPU. Under these circumstances, the instructions may be executed by causing the CPU to execute an interpreter that interprets the instructions, or by causing the CPU to execute instructions which convert the received instructions to instructions which can be directly executed by the CPU. In other embodiments, hardwired circuitry may be used in place of, or in combination with, software instructions to implement the present invention. Thus, the present invention is not limited to any specific combination of hardware circuitry and software, nor to any particular source for the instructions executed by the target.

Figure 1:
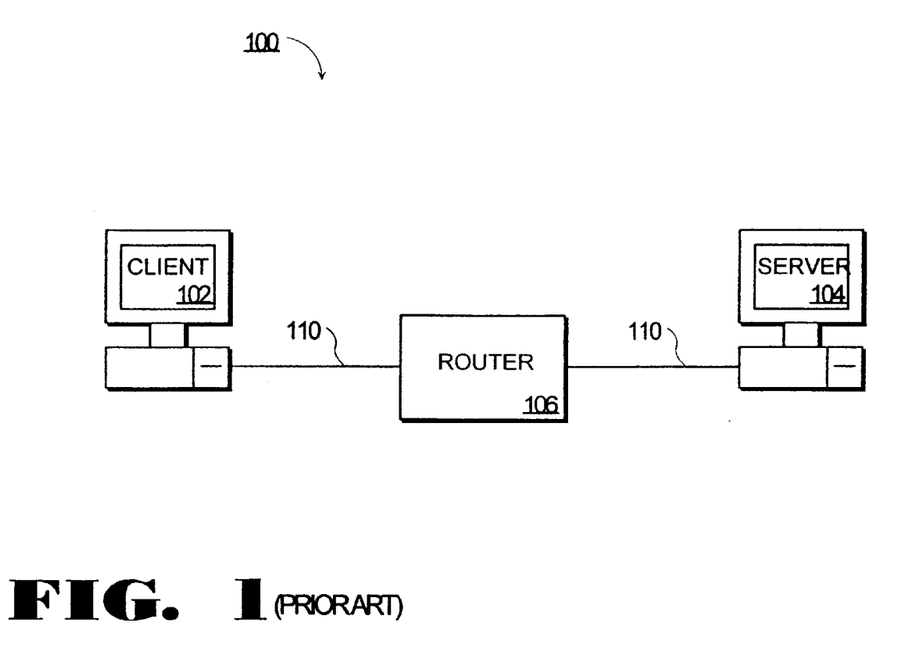
FIG. 1 illustrates a network including client/server computers sending and receiving data, such as video clips, which may be used to implement an embodiment of the present invention.

FIG. 1 illustrates a network 100 in which audio/visual data is transmitted between computers and network stations, and which may be used to implement an embodiment of the present invention. Client computer 102 is coupled to a network server 104 over network line 110. The network 100 may include one or more routers 106 which serve to buffer and route the transmitted data. Each of the devices on the network represents a network station. The network line 110 and router 106 may be utilized by a network such as the Internet, a Wide Area Network (WAN), a local area network (LAN), or any combination thereof. The server 104 contains application programs and/or data which are accessible over the network by other network stations, such as client 102.

Figure 2:
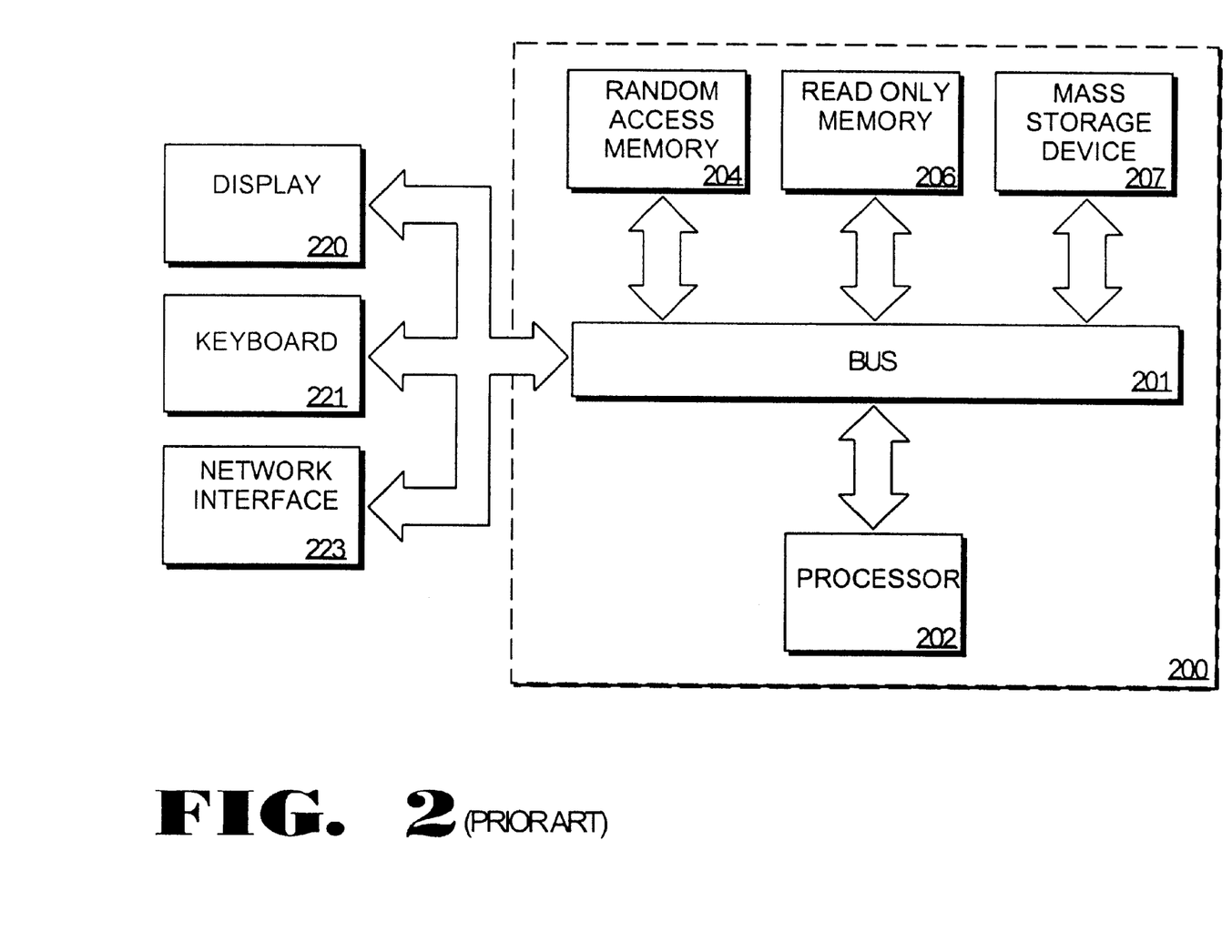
FIG. 2 is a block diagram of a computer system which may be used to implement an embodiment of the present invention.

FIG. 2 illustrates a block diagram of a computer in the network of FIG. 1. The architecture depicted in FIG. 2 is applicable to any client, server, or network router used in conjunction with the present invention. The computer system 200 includes a processor 202 coupled through a bus 201 to a random access memory (RAM) 204, a read only memory (ROM) 206, and a mass storage device 207, such as a disk or tape drive for storing data and instructions. An input device 221, such as a keyboard or mouse, is coupled to bus 201 for communicating information and command selections to processor 202. A display device 220 for providing visual output is also coupled to processor 202 through bus 201. Network interface device 223 is coupled to bus 201 and provides a physical and logical connection between computer system 200 and the network medium. Depending on the network environment in which computer 200 is used, this connection is typically to a network router, but can also be directly to another host computer. Note that the architecture of FIG. 2 is provided only for purposes of illustration, and that a host computer or a router used in conjunction with the present invention is not limited to this specific architecture.

Embedded Video Clips

The present invention includes a method for improving the quality of transmitted data such as audio/visual sequences which have been downloaded to a client computer over a network. The present invention may be used with network transmitted data which represents merely audio data (e.g., a sound recording), or merely video data (e.g., a silent movie), or combined audio/visual data (e.g., a movie with sound). The present invention may also be used with any network, including the Internet, or the World Wide Web portion of the Internet, or any local area network. The following description will, however, focus on the repeated viewing of video clips from the World Wide Web for purposes of explanation, and it will be appreciated that the invention is not limited to this use.

Many audio/visual sequences such as music videos or excerpts from movies or television shows are available on internet sites by servers which maintain World-Wide Web pages. A server provides access to video clips stored in its memory or storage device through a web server program, and a client downloads and displays information from the network using a web browser program. A web browser is an application program which accesses and provides links for web pages available on various internet sites. Many web browsers also provide "plug-ins" for related programs such as search engines, and display programs. These plug-in programs allow for the presentation of sophisticated data such as multimedia displays or application programs.

Figure 3:
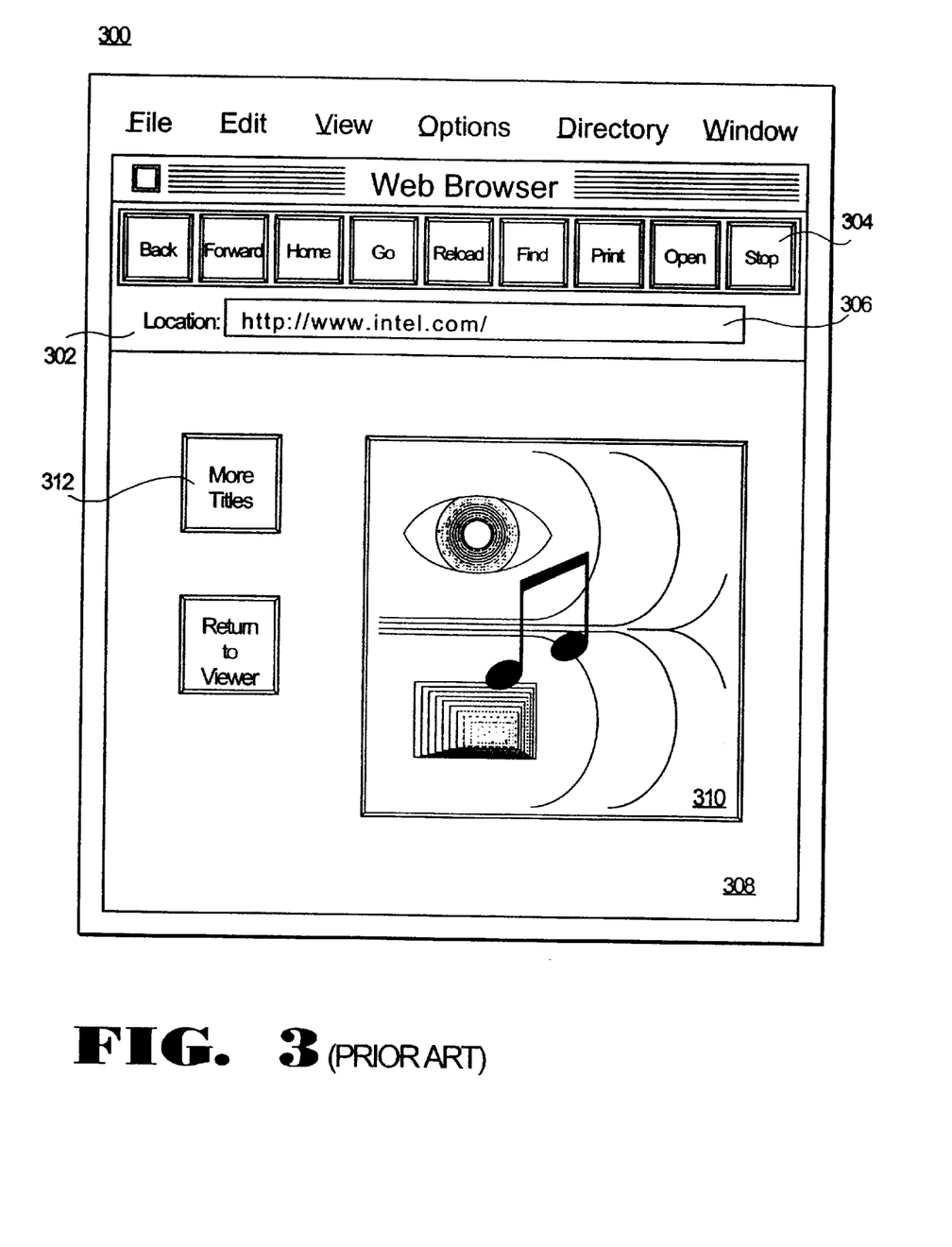
FIG. 3 illustrates a video clip embedded within a World-Wide Web page.

FIG. 3 illustrates a sample web page containing an embedded music video which has been accessed by a web browser on a network client. Screen display 300 contains an web browser window 302. Web browser window 302 contains several fields including option buttons 304, a Uniform Resource Locator (URL) field 306, and web page 308. Web page 308 contains text and/or graphic information related to the web site specified in the URL field 306. Web page 308 includes a display window 310 for the display of a audio/visual sequence. If the web browser contains the appropriate viewing program, a video clip may be displayed within window 310. Such a video could show a band playing a song, while the music is output through speakers attached to the computer. The video clip displayed in window 310 may be accessed within web page 308 by specifying a sub-address within URL field 306 or selecting a hypertext link or option button, such as button 312. To replay the video, the user would re-type the URL location or select the appropriate option button.

The rate at which the video clip is transmitted over the network is determined by the transmission bandwidth of the network. In a typical network, such as network 100, the transmission bandwidth is primarily limited by the bandwidth of the network interface devices 223 contained in server 104, client 102, and router 106. For the purposes of this discussion, it is assumed that both client 102 and server 104 utilize a 28.8 Kbit/second modem as the network interface device. It is further assumed that the network bandwidth is effectively limited by the speed of the modems and not by any internal data path or network media limitations. A 28.8 Kbit/second modem produces a best case data transmission rate of up to 28.8 Kbits/second. However because of practical limitations, and in order to transmit packets that all client computers can receive, servers may send data at much lower bit-rate, such as 22Kbits/second. A video clip which contains video data as well as audio data must split the available bandwidth between these two data types.

Figure 4A:
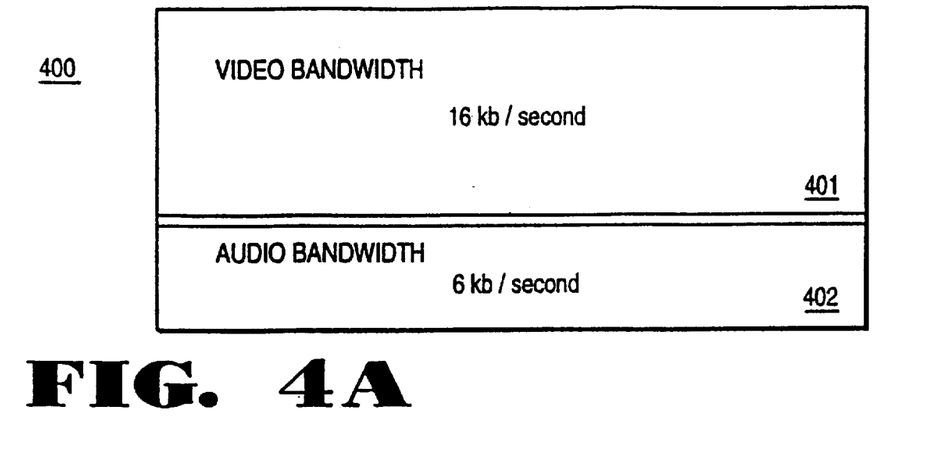
FIG. 4a illustrates a bandwidth allocation for a first access of a video clip within a Web page according to one embodiment of the invention.
Figure 4B:
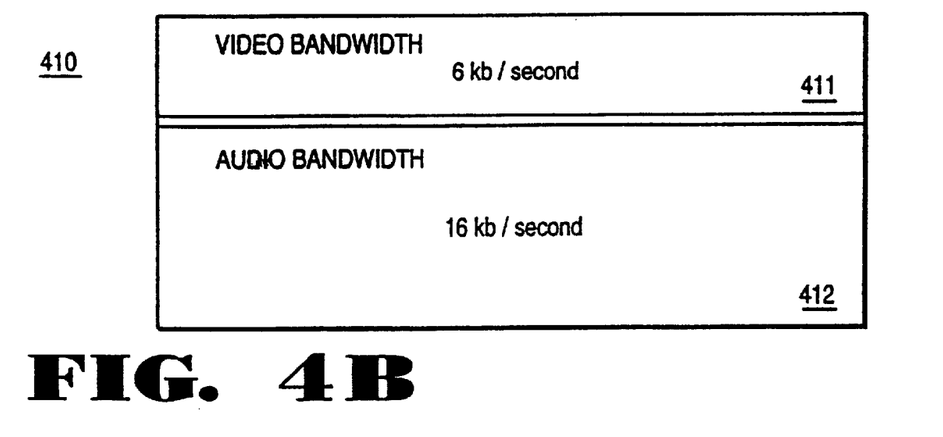
FIG. 4b illustrates a bandwidth allocation for a second access of a video clip within a Web page according to one embodiment of the invention.
Figure 4C:
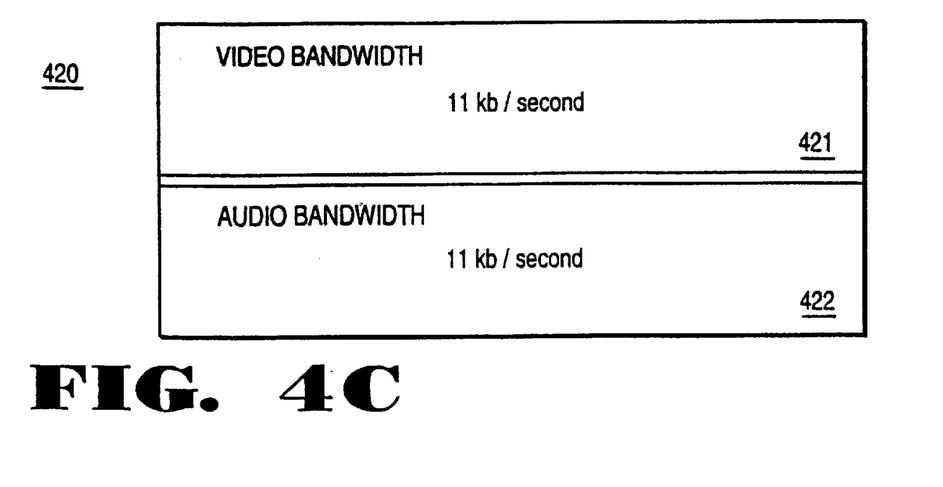
FIG. 4c illustrates a bandwidth allocation for a third access of a video clip within a Web page according to one embodiment of the invention.

FIGS. 4a, 4b, and 4c illustrate examples of bandwidth allocation for a video clip containing both an audio track and a video track. The video clip is transmitted from a server over a network which is bandwidth limited to a maximum transmission rate of 22Kbits/second. The server incorporates a compression stage which generates scalable bitstreams, and can therefore scale the transmission rate of the transmitted data. FIG. 4a illustrates a typical allocation of the 22Kbits/second bandwidth 400 for a video clip which provides the minimum acceptable quality experience for viewing a sequence of images and hearing some audio. In this case, the video channel is allocated a portion of the bandwidth 401 which allows a transmission rate of 16 Kbits/second. The audio channel is then allocated the remainder of the bandwidth 402 which allows for a transmission rate of 6 Kbits/second. In FIG. 4b, the allocation of bandwidth 410 for the audio and video channels is the reverse of FIG. 4a. In this case, the audio data is transmitted at a rate of 16 Kbits/second 411, while the video data is transmitted at 6 Kbits/second 412. In FIG. 4c, the audio and video channels are each allocated one-half the available bandwidth 420. The video data is transmitted at 11 Kbits/second 421, and the audio data is also transmitted at 11 Kbits/second 422. It should be noted that the proportions illustrated in FIGS. 4a, 4b, and 4c are provided as examples only, and that many other proportions of bandwidth allocation are available.

Iterative Improvement of Video Quality

The network environment illustrated by FIG. 1 will be used to describe the method of the present invention. In network 100, server 104 stores an audio/visual sequence such as a music video clip. Upon request by client 102, server 104 transmits the video clip over network medium 110 for display on client 102. The video clip contains audio data representing a music or voice track, and a series of digital graphic images which form a video sequence. According to one embodiment of the present invention, server 104 compresses the audio and visual data comprising the video sequence and transmits the compressed data as a scalable bitstream over network medium 110. A scalable bitstream is a data stream in which the number of bits encoding an object to be transmitted may be specified by the server. This allows the server to transmit different versions of the audio and visual channels comprising the video clip, depending on the number of bits used to code the graphic images and the audio track. In order to store and display successive versions of a transmitted bitstream which has been scaled by server 104, client 102 executes an application program or web server that can differentiate and request the successive versions of the bitstream encoding the video clip.

Server 102 may utilize a standard compression standard, such as H.263 or MPEG for compressing the data to be transmitted. The H.263 standard is a motion sequence compression standard for low-bandwidth real-time Video compression. The MPEG standard is an image sequence compression system for compressing a signal containing a video channel and a pair of audio channels. The MPEG-1 standard applies for image resolutions of approximately 360 pixels× 240 lines and bit rates of about 1.5 Mbits/second. MPEG-2 is a standard designed for higher resolutions and higher bit rates (4–10 Mbits/second). As will be apparent to those skilled in the art, various other compression standards may be utilized in conjunction with the present invention.

Figure 5:
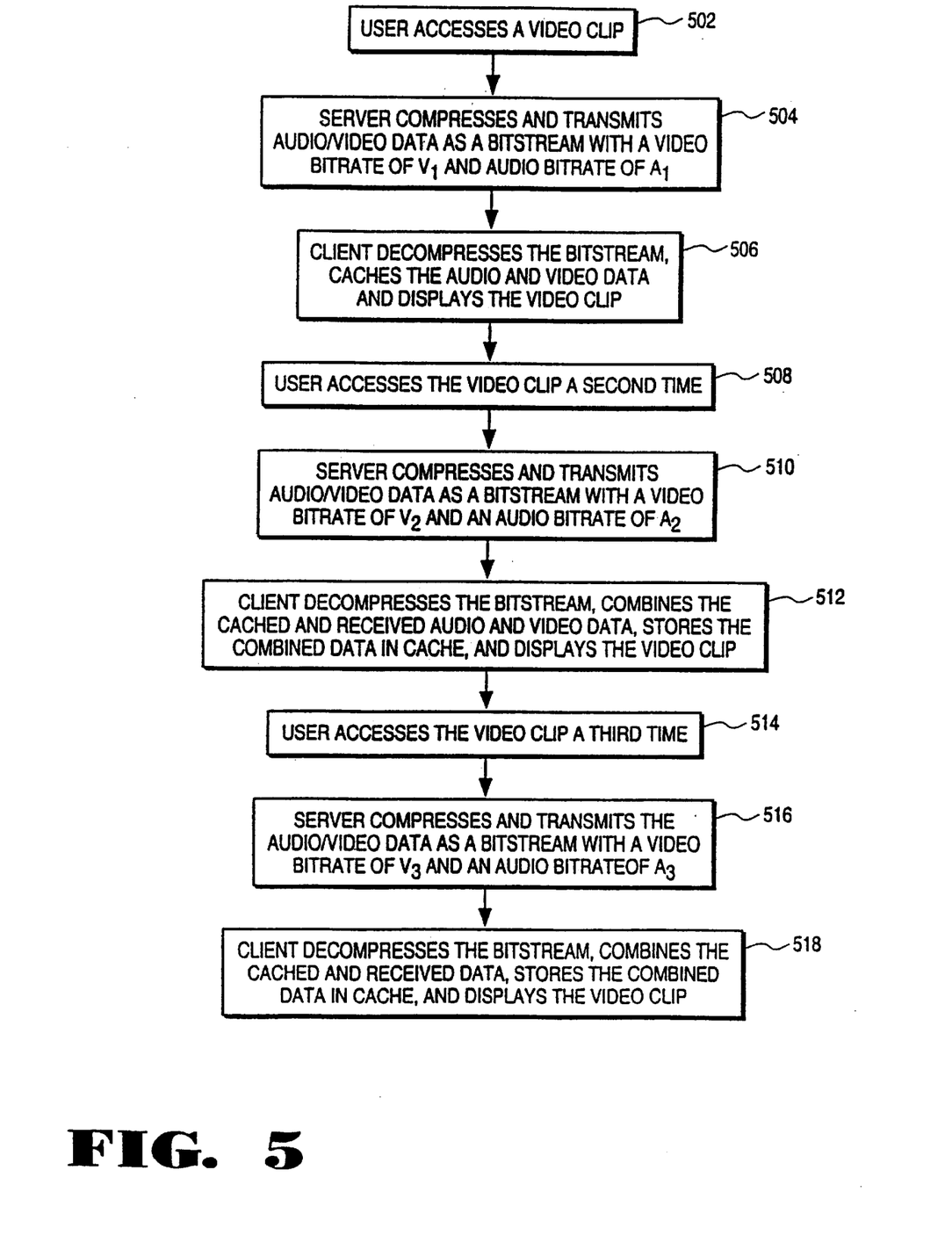
FIG. 5 is a flow chart illustrating the process of improving the quality of a video clip through user-initiated iterative access and caching according to one embodiment of the present invention.

FIG. 5 is a flow chart illustrating the process of improving the quality of an embedded video clip through iterative accesses of the clip according to one embodiment of the present invention. In step 502, the user accesses a video clip on server computer 104 using a web browser 300 running on client computer 102. The user may access the video clip by typing the appropriate location address in the URL field 306 of the web browser, or by selecting an appropriate hypertext link button 312. Upon receiving the command to transmit the video, server 104 compresses and transmits the audio/visual data comprising the video clip and transmits the data over network line 110 to client 102, step 504. Server 104 employs a transmission mechanism that allows audio/visual data to be transmitted as a scalable bitstream. The video is sent at a bit-rate denoted V1 and the audio is sent at a bit-rate denoted A1. Assuming no other traffic is sent over the network from server 104 to client 102 during the transmission of the video clip, the sum of the bit-rates V1 and A1 equal the maximum effective transmission bandwidth between server 104 and client 102. This maximum effective transmission bandwidth will be determined by the transmission rate of the slowest device in the data path between server 104 and client 102, and is typically the network interface device 223, such as a modem or ethernet controller.

Upon receiving the data stream from the server 104, client 102, at step 506, decompresses the bit-stream, stores the audio and video in cache memory, and displays the video clip. The cache memory may be implemented in the on-board RAM 204, or on disk 207, or on any combination thereof. The method used to store the data in cache may utilize any standard caching techniques known to those of ordinary skill in the art.

The first selection of the video clip may result in a bandwidth allocation such as is illustrated in FIG. 4a. That is, if the maximum effective bandwidth between the server and client is 22 Kbits/second, the video band may be transmitted at 16 Kbits/second, while the video band is transmitted at 6 Kbits/second. In step 508, the user accesses the video clip a second time. Part of the request from client 102 includes a command header which indicates that the first access was at a bit-rate apportionment of V1 and A1. In response, the server 104 compresses and transmits the audio/video as a scalable bitstream, step 510. For the second transmission, the video data is transmitted at a bit-rate denoted V2 and the audio is transmitted at a bit-rate denoted A2. The second selection of the video clip may result in a bandwidth allocation such as is illustrated in FIG. 4b. That is, with the maximum effective bandwidth between the server and client at 22 Kbits/second, the video band may be transmitted at 6 Kbits/second, while the video band is transmitted at 16 Kbits/second.

Upon receiving the second data stream from the server 104, client 102, at step 512, decompresses the bit-stream, combines the received audio and video data to the audio and video data stored in cache memory in step 506, and displays the combined video clip. The combined video clip as displayed appears as if the video channel was transmitted at a rate of V1+V2, and the audio channel was transmitted at a rate of A1+A2. Using the bit-rates provided in the examples of FIGS. 4a and 4b, this produces audio data with an effective bandwidth of 6+16=22 KBits/second, and video data with an effective bandwidth of 16+6=22 KBits/second. Thus, this method causes the video to appear and sound as if both the audio and video signals were transmitted at the maximum possible speed, thus effectively doubling the available bandwidth of the network.

If the user desires a still higher quality experience, the user may access the video clip a third time, step 514. Again, part of the request from client 102 includes a command header which indicates that the second access was at a bit-rate apportionment of V2 and A2. In response to the third request, the server 104 compresses and transmits the audio/video as a scalable bitstream, step 516. For the third transmission, the video data is transmitted at a bit-rate denoted V3 and the audio is transmitted at a bit-rate denoted A3. The third selection of the video clip may result in a bandwidth allocation such as is illustrated in FIG. 4c. That is, with the maximum effective bandwidth between the server and client at 22 Kbits/second, the video and audio bands may each be transmitted at 11 Kbits/second, thus providing a further refinement to each component of the video.

Upon receiving the third data stream from the server 104, client 102, at step 518, decompresses the bit-stream, combines the received audio and video data to the audio and video data stored in cache memory in steps 506 and 512, and displays the combined video clip. The combined video clip as displayed appears as if the video channel was transmitted at a rate of V1+V2+V3, and the audio channel was sent at a rate of A1+A2+A3. This causes the video to appear and sound as if both the audio and video signals were transmitted at a rate greater than the maximum possible speed, and thus effectively tripling the available bandwidth.

Each subsequent access of the video clip by the client results in the re-transmission and re-caching or integration of the audio and/or video data which produces an increasing apparent transmission bandwidth and refinement of the displayed image and projected sound. It should be noted, however, that the present invention does not require, nor is it limited to any specific number of iterations. The user may access a video clip as many or as few times as desired to attain the desired quality.

Figure 6:
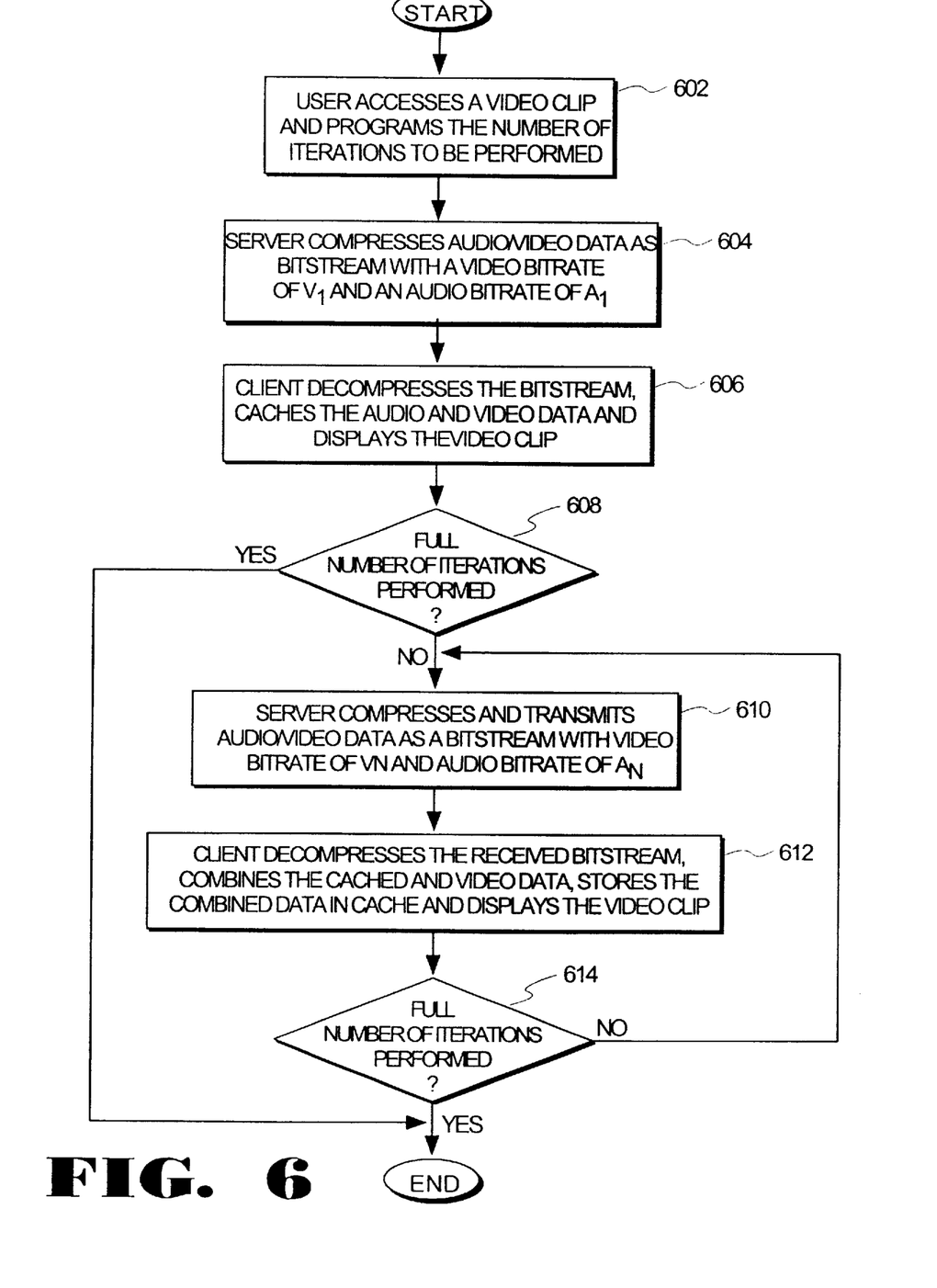
FIG. 6 is a flow chart illustrating the process of improving the quality of a video clip through automatic iterative access and caching according to one embodiment of the present invention.

FIG. 6 is a flowchart illustrating the improved display of an embedded video clip according to an alternative embodiment of the present invention. According to the method represented by FIG. 6, the server automatically transmits successive iterations of the video clip without requiring the user to re-select the video clip on the client. In step 602, the user accesses a video clip on server computer 104 using a web browser 300 running on client computer 102. The user may access the video clip by typing the appropriate location address in the URL field 306 of the web browser, or by selecting an appropriate hypertext link button 312. The user also specifies the number of successive times the video is to be displayed. Alternatively, this parameter could be pre-programmed into the web browser program running on client 102 or the web server program running on server 104. Upon receiving the command to transmit the video, server 104 compresses and transmits the audio/visual data comprising the video and transmits the data over network line 110 to client 102, step 604. The audio/visual data is transmitted by server 104 as a scalable bitstream. The video is sent at a bit-rate denoted V1 and the audio is sent at a bit-rate denoted A1.

Upon receiving the data stream from the server 104, client 102, at step 606, decompresses the bit-stream, stores the audio and video in cache memory, and displays the video clip. The first selection of the video clip may result in a bandwidth allocation such as is illustrated in FIG. 4a. That is, if the maximum effective bandwidth between the server and client is 22 Kbits/second, the video band may be transmitted at 16 Kbits/second, while the video band is transmitted at 6 Kbits/second. In step 608, the client process checks the counter which stores and decrements the iteration parameter to determine whether a subsequent access of the video clip is to be performed. If not, the process ends. If subsequent accesses remain, client 102 requests server 104 to retransmit video clip. Part of the request from client 102 includes a command header which indicates that the first access was at a bit-rate apportionment of V1 and A1. In response, the server 104 compresses and transmits the audio/video as a scalable bitstream, step 610. For the subsequent transmissions at varying bandwidth apportionments, the video data is transmitted at a bit-rate denoted Vn and the audio is transmitted at a bit-rate denoted An.

Upon receiving a subsequent data stream from the server 104, client 102, at step 612, decompresses the bit-stream, combines the received audio and video data to the audio and video data stored in cache memory in step 606, and displays the combined video clip. The combined video clip as displayed appears as if the video channel was transmitted at a rate of $V1+\Sigma An$, and the audio channel was sent at a rate of $A1+\Sigma An$, where 'n' is the number of times the video clip was re-transmitted from the server 104 to the client 102. This causes the video to appear and sound as if both the audio and video signals were transmitted at the maximum possible speed or greater, thus effectively multiplying the available bandwidth by the factor of n.

In step 614, the client process checks the iteration parameter counter to determine whether subsequent access of the video clip are to be performed. If not, the process ends. If subsequent accesses remain, client 102 requests re-transmission of the video clip, and the process proceeds from step 610, with each transmission occurring at a bit-rate apportionment of An and Vn.

In one embodiment of the present invention, the client caches data from an initial access of the video clip and combines the cached data with data transmitted from a successive access to achieve the perceived increase in network bandwidth. For an audio channel contained within a video clip, one method of combining the cached data with subsequently transmitted data is to employ a frequency scaling algorithm. In frequency scaling, the server partitions the frequency spectrum in which the signal is present and transmits a first group of frequencies within the spectrum in the first access; a second group of frequencies in the second access, a third group of frequencies in the third access, and so on. An example related to the present invention would be a first access which causes the server to send the mid-range component of the audio data (e.g., 5 KHz to 12 KHz), a second access which causes the server to send the low, frequency component of the audio data (e.g., 2 KHz to 5 KHz), and a third access which causes the server to send the high frequency component of the audio data (e.g., 12 KHz to 20 KHz). The combination of these groups of frequencies in the client produces a signal which contains frequencies across the entire audible spectrum.

An alternative method of combining cached and re-transmitted audio data is one in which the server transmits the first instance utilizing a low bit-rate algorithm, and transmits a second instance utilizing higher bit-rate algorithm. Using a residual coding method, the server uses as input to the higher bit-rate algorithm, the difference between the original signal and the reconstructed signal obtained from decoding the output of the first algorithm.

For a video channel contained within a video clip, one method of combining the cached data with subsequently transmitted data is to employ a temporal scaling algorithm. Temporal scaling utilizes the partitioning of a video into a sequence of individual frames. A first access of a video clip by a client causes the server to transmit a certain group or sub-sequence of frames from the server. A subsequent access causes the transmission of a different group or sub-sequence of frames, which are then combined with the first group to produce a clip which contains both groups of frames.

An alternative method of combining cached and re-transmitted video data, which may be used in cases where the video signal is not compressed, involves partitioning the pixels which comprise the graphic images contained in the video clip. According to this method, a first access of a video clip by a client causes the server to transmit a first group of pixels contained in an image. A second access causes the server to transmit a second group of pixels in the image, and subsequent accesses cause the server to transmit subsequent and different groups of pixels. These pixel groups are then combined within the client to produce a clip which contains each group of pixels.

In an alternative embodiment of the present invention, instead of combining the received and cached data, client 102 replaces the cached data with the received data in the instances in which the subsequently received data was transmitted at a higher bit-rate than the previously transmitted data. Such an embodiment might be utilized in cases where cache memory is not sufficiently available to store multiple iterations of received data.

Various other techniques for transmitting and integrating successive audio and/or video bitstreams will be apparent to those of ordinary skill in the art. It should be noted that the present invention is not limited to the use of a particular transmission or integration technique.

In one embodiment of the present invention the server transmits the audio and/or video channels contained in a video clip as scalable bitstreams. This provides a mechanism by which the server may scale or select components of the original signal for transmission. In order to effectively construct an audio/visual sequence which approaches the quality of the original sequence through iterative improvement, the server must send different versions of the original sequence (e.g., different frames of a video clip, or different frequency bands of an audio clip). The integration of these different versions in the client creates an improved version with each iteration. The client must thus communicate to the server that a previous access resulted in the transmission of a particular set of data, and that a subsequent access requires a different set of data. According to one method of the present invention, the client transmits a command word to the server during a request for the server to download the audio/visual sequence over the network. The command word includes a data field which specifies the previous version of the sequence which was transmitted. The sender then responds by transmitting a version which does not match the version specified in the command word. Alternatively, the client may specify the particular version of the sequence to be transmitted in the present access. In this case, the server must implement a decoding mechanism to correlate the command word with the scalable bitstream corresponding to the requested version. In one embodiment of the present invention, the command word and communication protocol between the client and server is implemented within an applet in the application utilized to view or play the video clip within the web page.

In the foregoing, a method and apparatus have been described for improving the quality of an audio/visual sequence displayed on a client computer on a network. Although the present invention has been described with reference to specific exemplary embodiments, it will be evident that various modifications and changes may be made to these embodiments without departing from the broader spirit and scope of the invention as set forth in the claims. Accordingly, the specification and drawing are to be regarded in an illustrative rather than a restrictive sense.

What is claimed is:

1. A server computer comprising:

a processor; and processing logic executable by said processor to transmit a data object to a client computer via a network and partition said data object into separate iteratively transmittable versions of said data object of improving quality, each of said versions including a first component and a second component and being transmitted to said client as a scalable bitstream.

2. The server computer as claimed in claim 1 wherein said first component of each of said versions of said data object comprises audio data and said second component of each of said versions of said data object comprises video data.

3. The server computer as claimed in claim 1 wherein each of said versions of said data object represents a different frame of said data object.

4. The server computer as claimed in claim 1 wherein each of said versions of said data object represents a different frequency band of said data object.

5. The server computer as claimed in claim 1 wherein said processing logic receives a command from said client computer, said command specifying a version of said data object.

6. The client computer as in claim 5 wherein said first bit-rate and said second bit-rates are different bit-rates.

7. A client computer comprising:

a processor; and processing logic executable by said processor to receive a first set of scalable bitstream data representing a data object from a server computer coupled to the client computer via a network and a second set of scalable bitstream data representing said data object, said first and second sets of scalable bitstream data each including a first component and a second component;

the processing logic further executable by said processor to integrate said first set of scalable bitstream data with said second set of scalable bitstream data such that said first component of said first set of scalable bitstream data is integrated with said first component of said second set of scalable bitstream data and said second component of said first set of scalable bitstream data is integrated with said second component of said second set of scalable bitstream data.

8. The client computer as in claim 7 further including a web browser.

9. The client computer as in claim 7 wherein said first component of said first and second sets of scalable bitstream data comprises audio data and said second component of said first and second sets of scalable bitstream data comprises video data.

10. The client computer as in claim 7 wherein said first set of scalable bitstream data is received at a first bit-rate and said second set of scalable bitstream data is received at a second bit-rate.

11. The client computer as in claim 10 wherein said first bit-rate and said second bit-rate are different rates.

12. The client computer as in claim 7 further including a memory, said first and second sets of scalable bitstream data being combined with previously received scalable bitstream data in said memory.

13. The client computer as in claim 7 wherein said first set of scalable bitstream data represents a different frame than said previously received scalable bitstream data.

14. The client computer as in claim 7 wherein said second set of scalable bitstream data represents a different frequency band than said previously received scalable bitstream data.

15. A client computer comprising:

a processor; and processing logic executable by said processor to transmit a message to a server computer coupled to said client computer via a network, said message requesting said server to provide a second set of data such that said second set of data is different than a first set of data previously received at said client computer, and without transmitting said message, said server computer will retransmit said first set of data, said first set of data and said second set of data are transmitted by said server computer as first and second scalable bitstreams; and the processing logic further executable by said processor to integrate said first scalable bitstream with said second set of scalable bitstream data and to combine said first and second sets of scalable bitstreams to produce a better aggregate representation of said data object.

16. The client computer as in claim 15 further including a web browser.

17. The client computer as in claim 15 wherein said data object is selected from the group consisting of an audio recording, a video recording, and an audio/video recording.

18. The client computer as in claim 15 wherein said first set of scalable bitstream data is received at a first bit-rate and said second set of scalable bitstream data is received at a second bit-rate, said first bit-rate and said second bit-rate being different rates.

19. The client computer as in claim 15 further including a memory, said first and second sets of scalable bitstreams being combined in said memory.

20. The client computer as in claim 15 wherein said first set of scalable bitstream data represents a different frame than said previously received scalable bitstream data.

21. The client computer as in claim 15 wherein said second set of scalable bitstream data represents a different frequency band than said previously received scalable bitstream data.

22. The client computer as in claim 15 further comprising an application program, wherein said application program automatically executes receiving at said client computer said second set of data.

* * * * *

UNITED STATES PATENT AND TRADEMARK OFFICE
CERTIFICATE OF CORRECTION

PATENT NO. : 6,363,413 B2
DATED : March 26, 2002
INVENTOR(S) : Kidder

It is certified that error appears in the above-identified patent and that said Letters Patent is hereby corrected as shown below:

<u>Column 9,</u>
Line 16, delete "$V1+\Sigma An$", insert -- $V1+\Sigma Vn$ --.

Signed and Sealed this

Fifteenth Day of October, 2002

*Attest:*

JAMES E. ROGAN
*Attesting Officer*     *Director of the United States Patent and Trademark Office*